(12) United States Patent
Obrachta et al.

(10) Patent No.: US 7,347,961 B2
(45) Date of Patent: Mar. 25, 2008

(54) METHOD AND SYSTEM HAVING A FLOWABLE PRESSURE PAD FOR CONSOLIDATING AN UNCURED LAMINATE SHEET IN A CURE PROCESS

(75) Inventors: Kevin L. Obrachta, Wichita, KS (US); Blaise F. Bergmann, Wichita, KS (US)

(73) Assignee: The Boeing Company, Chicago, IL (US)

( * ) Notice: Subject to any disclaimer, the term of this patent is extended or adjusted under 35 U.S.C. 154(b) by 242 days.

(21) Appl. No.: 10/404,993

(22) Filed: Apr. 1, 2003

(65) Prior Publication Data

US 2004/0195718 A1    Oct. 7, 2004

(51) Int. Cl.
B29C 65/74    (2006.01)

(52) U.S. Cl. ............. 264/156; 264/257; 425/290; 425/DIG. 37

(58) Field of Classification Search ............... None
See application file for complete search history.

(56) References Cited

U.S. PATENT DOCUMENTS

| | | | |
|---|---|---|---|
| 2,142,728 A | | 1/1939 | Kienzle |
| 2,501,817 A | * | 3/1950 | Jaeger .................. 30/446 |
| 2,611,434 A | | 9/1952 | Mugler |
| 3,440,117 A | | 4/1969 | Soloff et al. |

(Continued)

FOREIGN PATENT DOCUMENTS

EP    0314353 A2    3/1989

(Continued)

OTHER PUBLICATIONS

T.W. Clyne & W.J. Clegg, Enhancing the Formability of Long Fibre Thermoplastic Composites by Microperforation, Oct. 2003, EPSRC Final Report, Grant Reference No. GR/K33637, University of Cambridge, United Kingdom.

Primary Examiner—Edmund H. Lee
(74) Attorney, Agent, or Firm—Ostrager Chong Flaherty & Broitman, P.C.

(57) ABSTRACT

A method and system (10) having a flowable pressure pad (22) for consolidating an uncured laminate sheet (14) during a cure cycle is provided. The system (10) includes an autoclave machine (12) for utilizing a pinmat (20) for to perforate and consolidate the sheet (14). This pinmat (20) has a mat portion (28) and a plurality of pins (26) extending from the mat portion (28). These pins (26) are intended to penetrate the uncured laminate sheet (14) during a perforation cycle that occurs prior to the cure cycle. During the cure cycle, the autoclave machine (12) applies a predetermined amount of and pressure heat to the pressure pad (22) for a predetermined amount of time so as to cause the pressure pad (22) to flow around the protruding pins (26). This feature allows the pressure pad (22) to transfer a substantial portion of the applied pressure to the uncured laminate sheet (14) so as to improve consolidation of the sheet (14). In this regard, less pressure is unintentionally transferred to the protruding pins (26). The pressure pad (22) is fabricated from a flowable or malleable material that allows the pressure pad (22) to flow around the protruding pins (26).

9 Claims, 6 Drawing Sheets

U.S. PATENT DOCUMENTS

| | | | |
|---|---|---|---|
| 3,559,445 A | | 2/1971 | Hougen |
| 3,704,194 A | | 11/1972 | Harrier |
| 3,719,736 A | * | 3/1973 | Woodruff .................... 264/156 |
| 3,787,546 A | | 1/1974 | Pratt et al. |
| 4,131,664 A | | 12/1978 | Flowers |
| 4,132,519 A | | 1/1979 | Reed |
| 4,160,055 A | * | 7/1979 | Reed .......................... 428/131 |
| 4,176,567 A | | 12/1979 | Weisberg |
| 4,211,590 A | | 7/1980 | Steward et al. |
| 4,486,372 A | | 12/1984 | Millard et al. |
| 4,696,711 A | | 9/1987 | Greszczuk |
| 5,126,091 A | * | 6/1992 | Melton ........................ 264/257 |
| 5,141,690 A | * | 8/1992 | Marshall ..................... 264/154 |
| 5,252,279 A | * | 10/1993 | Gore et al. .................. 264/154 |
| 5,268,055 A | | 12/1993 | Bales et al. |
| 5,304,217 A | | 4/1994 | Stephenson et al. |
| 5,631,619 A | | 5/1997 | Evans |
| 5,876,405 A | * | 3/1999 | Del Rio et al. ............... 606/80 |
| 5,926,900 A | | 7/1999 | Bennett |
| 6,179,643 B1 | | 1/2001 | Fukuda |
| 6,179,943 B1 | | 1/2001 | Welch |
| 6,190,602 B1 | | 2/2001 | Blaney et al. |
| 6,399,524 B1 | | 6/2002 | Creasy |
| 6,451,241 B1 | | 9/2002 | Ohliger et al. |
| 6,630,221 B1 | | 10/2003 | Wong |
| 2002/0020688 A1 | | 2/2002 | Sherman et al. |
| 2004/0195716 A1 | | 10/2004 | Bergmann |

FOREIGN PATENT DOCUMENTS

| | | |
|---|---|---|
| EP | 0471459 A1 | 2/1992 |
| WO | 96/39288 | 12/1996 |
| WO | WO 96/39288 | * 12/1996 |

* cited by examiner

METHOD AND SYSTEM HAVING A FLOWABLE PRESSURE PAD FOR CONSOLIDATING AN UNCURED LAMINATE SHEET IN A CURE PROCESS

CROSS-REFERENCE TO RELATED APPLICATIONS

The present application is related to U.S. application Ser. No. 10/397,003 entitled "LOW PENETTRATION-FORCE PINMA FOR PERFORATING AN UNCURED LAMINATE SHEET" and U.S. application Ser. No. 10/404,742 entitled "METHOD AND SYSTEM FOR LOW PRESSURE PERFORATION OF AN UNCURED LAMINATE SHEET", which are simultaneously filed herewith and the disclosures of which are incorporated by reference herein.

TECHNICAL FIELD

The present invention relates generally to perforated composite laminate sheets, and more particularly to a method and system for manufacturing a perforated composite laminate sheet.

BACKGROUND OF THE INVENTION

Nacelles are well known in the aviation industry as streamlined enclosures for aircraft engines. Each enclosure ordinarily includes one or more acoustic liners with perforated face sheets for absorbing engine noise, directing airflow around the engine, and providing structural support for the engine. These face sheets can be comprised of composite laminates, which are beneficial because they have substantially lightweight characteristics, desirable resistance to fatigue in sonic environments, substantial formability, and favorable life cycle costs.

The perforated composite laminate sheets can be manufactured by utilizing one or more pinmats, a high-pressure perforation machine, and an autoclave machine, which together perfonn a three-cycle operation. This operation typically includes a lay-up cycle, a perforation cycle, and a cure cycle.

Prior to the lay-up cycle, a contoured tool base is prepared by nesting two or more pinmats together on a surface of the tool base. These nested pinmats can form a desired pin field that defines an area of the face sheet to be perforated. Each pinmat ordinarily includes a thick mat portion and a dense population of pins extending from the mat portion. These pins typically are intended to perforate an uncured laminate sheet. For this reason, the uncured laminate sheet ordinarily is laid on top of the bed of pins that extend from the pinmats.

In the lay-up cycle, a vacuum device normally is utilized for forming an uncured laminate sheet from a series of individual sheets of raw composite materials. Specifically, a predetermined number of the individual sheets are stacked in succession on the surface of the tool base. Thereafter, a vacuum bagging film can be placed over the sheets and sealed against the surface of the tool base. This construction permits air to be drawn from within the bagging film thereby subjecting the stack of sheets to a predetermined amount of compaction pressure, e.g. about 10-14 psi, for a predetermined amount of time. This compaction pressure typically compresses the stack of individual sheets into a single uncured laminate sheet. Once this sheet has been formed, a perforation procedure typically is commenced.

During the high-pressure perforation cycle, the uncured laminate sheet usually is perforated by a high-pressure perforation machine. The uncured laminate sheet usually has a somewhat flexible pressure pad ("perforation pressure pad") laid thereon. This perforation pressure pad usually is a sheet comprised of a silicone rubber material and is intended to transfer pressure, e.g. about 500-600 psi, from the high-pressure perforation machine to the uncured laminate sheet In this respect, the application of pressure can force the laminate sheet onto the pinmat thereby causing the pins to penetrate the laminate sheet in order to form the desired perforations.

The perforation of the laminate sheet typically requires that the pins displace continuous inelastic fibers within the laminate sheet beyond the paths of the pins. In particular, when the laminate sheet is laid upon the pinmat, the tip of each pin can contact an interface portion of a fiber. As the perforation machine forces the laminate sheet onto the pinmat, each pin typically displaces the interface portion of each fiber laterally outward with respect to the longitudinal axis of that fiber. As a result, the peripheral portions of each inelastic fiber can be drawn toward the interface portion of the fiber generally along the longitudinal axis of that fiber.

The lengthy nature of the fibers can create two conditions which require a substantially high amount of pressure, e.g. about 500-600 psi, for displacing the fibers and forming the perforations. First, each relatively long continuous fiber is firmly held in place by the interlocking nature of the fabric weave and to a lesser degree by a substantial amount of resin that is cast around the diameter of the fiber along the length of that fiber. The degree to which the interlocking fabric weave and the resin firmly bold the fiber in place correlates to the minimum amount of applied pressure required for causing the pin to overcome the grip of the interlocking weave and the resin so as to displace that fiber beyond the pin path. Second, the lattice nature of the woven fabric creates a field tension when the fabric is engaged by a substantial number of pins. This field tension increases the tensile stress within the fiber thereby increasing that fiber's resistance to being displaced by the pins. This resistance to displacement typically opposes pin penetration into the laminate sheet thereby opposing the formation of the perforations.

Moreover, recent studies have shown that the perforation of laminate sheets can also result from the fracture of the laminate fibers within the pin paths. The fracture of laminate fibers is evidenced by the deposits of fiber debris on the pin tips after the perforation cycle. The amount of debris indicates that a substantial amount of the fibers in the pin paths may be broken by the pins.

Specifically, a substantially high amount of pressure can be required to displace a continuous inelastic fiber such that it exceeds a critical stress level within that fiber. This critical stress can cause the fiber to fracture so as to create at least two shorter lengths of fiber from the original fiber. The fracture generally occurs at the location of pin penetration where the induced stresses within the fiber are the highest. After the fiber breaks, tension in that fiber is eliminated, between the nearest two points where that fiber was locked into the fabric weave, e.g. the nearest overlapping tows. As a result, the shorter lengths of fiber can be more easily displaced by the pins thereby permitting the pins to penetrate deeper into the sheet for contacting the next inelastic continuous fiber.

After the perforations have been formed, preparations are made for the cure cycle. In particular, the perforation-pressure pad typically is removed and a second more flexible consolidation pressure pad is placed on top of the pins.

Similar to the perforation pressure pad, the consolidation pressure pad ordinarily is a sheet of a silicone rubber material.

In the cure cycle, the tool base and a vacuum bagging film enclose the assemblage of the pinmats, the laminate sheet, and the consolidation pressure pad. Then, this assemblage is placed into an autoclave machine for applying predetermined amounts of heat and pressure, e.g. about 90 psi, to the laminate sheet. This combination of the applied pressure and heat can cause the consolidation pressure pad to slightly deform around the protruding pins and contact the laminate sheet. This engagement between the consolidation pressure pad and the laminate sheet may allow the consolidation pressure pad to transfer a portion of the applied pressure to the laminate sheet so as to compress the laminate sheet between the consolidation pressure pad and the mat portion of the pinmat. This compression causes the laminate sheet to be consolidated. At the conclusion of the cure cycle, the perforated composite laminate sheet is produced.

A drawback of the existing perforation system is that the pins typically have conical tips that require the high-pressure perforation machine to apply substantial amounts of pressure in order to cause the pins to perforate the laminate sheet. These conical tips typically have one or more smoothly curved surfaces that substantially distribute stresses within each fiber along its longitudinal axis near the pin-laminate engagement. In other words, the construction of each pin tip typically fails to concentrate stress at the interface portion of the fiber. As a result, the fiber can be subjected to nearly the full amount of its critical tensile stress before failing. For this reason, a relatively high amount of pressure typically must be applied to the laminate sheet in order to fracture and displace the fibers. This relatively high amount of pressure usually cannot be provided by an autoclave machine. Instead, a separate machine, e.g. the high-pressure perforation machine, normally is utilized for applying the substantially high amounts of pressure. This additional machine usuajly requires a substantial amount of time to complete the perforation cycle thereby increasing manufacturing cycle time, as well costs associated therewith. Such results clearly are undesirable.

Another drawback of the existing system is that the silicone rubber pressure pads usually lack sufficient elasticity for adequately deforming around the pins and consolidating the laminate sheet against the pinmat during the cure cycle. Instead, the pressure pad typically transfers a substantial portion of the pressure to the pins thereby inadequately consolidating the perforated regions of the laminate sheet. This poor consolidation can cause those perforated regions to have undesired porosity and hence lower strength characteristics.

Additionally, the inadequate consolidation of the perforated regions can create a pressure differential between the perforated regions of the sheet and the adjacent non-perforated regions of the sheet. In particular, a greater portion of the autoclave pressure can be transferred to the non-perforated regions of the laminate sheet while a smaller portion of the autoclave pressure is transferred to the perforated regions. This pressure differential typically causes resin within the laminate sheet to locally migrate from the higher-pressure non-perforated regions to the lower-pressure perforated regions. This resin migration results in the formation of a depression within the sheet along the perimeter of each perforated region. These depressions are disadvantageous because they typically are areas of weakness within the laminate sheet and can require additional finishing operations for repairing the surface of the sheet.

Therefore, a need exists for a method and system for manufacturing a perforated composite laminate sheet that decreases pressure requirements for the perforation of the laminate sheets, improves the consolidation of the laminate sheets, and decreases the manufacturing cycle time, as well as the costs associated therewith.

SUMMARY OF THE INVENTION

The present invention provides a method and system for manufacturing a perforated composite laminate sheet from an uncured laminate sheet. In one embodiment, the system includes an autoclave machine for perforating and consolidating the uncured laminate sheet in one combined cycle of operation. Specifically, the autoclave machine transfers a predetermined amount of pressure through a flowable pressure pad to the uncured laminate sheet so as to force the uncured laminate sheet onto a series of pins extending from a pinmat. The uncured laminate sheet is comprised of a series of individual sheets having a plurality of discontinuous fibers therein. These discontinuous fibers can be displaced beyond the paths of the pins at a relatively low applied pressure. The pinmat has a mat portion and a plurality of pins extending from the mat portion. Each pin includes a shank portion and a tip portion extending from the shank portion. The tip portion includes one or more facets positioned adjacent to one or more edges. Each edge is sufficiently sharp for fracturing the fibers of the laminate sheet at a relatively low applied pressure. Moreover, the flowable pressure pad is comprised of either a solid material with fluid-like properties or a material that can attain the fluid-like state when subjected to a predetermined pressure and temperature. This material allows the flowable pressure pad to flow or deform around the pins and transfer a substantial portion of the applied pressure to the laminate sheet for the purpose of fully consolidating the laminate sheet against the mat portion of the pinmat. Finally, the mat portion of the pinmat has one or more ventilation holes integrally formed therein for allowing gas surrounding the pins to be withdrawn therefrom. This withdrawal of gas can prevent the formation of a pocket of gas which can otherwise impede consolidation of the laminate sheet or adversely affect the aesthetics of the sheet.

One advantage of the invention is that a system having a low penetration-force pinmat has been provided that concentrates stress within laminate fibers so as to decrease the amount of pressure required to fracture the laminate fibers and allowing for the perforation of the laminate sheet at substantially low pressures.

Another advantage of the invention is that a system having a low penetration-force pinmat has been provided that increases the perforation speed of uncured laminates thereby decreasing the overall manufacturing cycle time and costs associated therewith.

Still another advantage of the invention is that a method and system is provided for perforating an uncured laminate sheet at a substantially low pressure thereby decreasing wear on the manufacturing equipment, the maintenance of the equipment, and the costs associated therewith.

Yet another advantage of the invention is that a method and system for consolidating an uncured laminate sheet is provided that allows for the improved consolidation of perforated regions of the laminate sheet so as to decrease the porosity within those regions, improve the overall strength characteristics of the sheet, and enhance the aesthetic appearance of the laminate sheet.

Still another advantage of the invention is that a method and system for consolidating an uncured laminate sheet is provided that substantially decreases the pressure differential between the perforated regions and the non-perforated regions of the laminate sheet thereby decreasing the localized resin migration and improving the overall strength characteristics of the laminate sheet.

Yet another advantage of the invention is that a method and system is provided for perforating and consolidating an uncured laminate sheet in one cycle of operation, which decreases the amount of equipment utilized to manufacture the sheets, the service required for maintaining the manufacturing equipment, the manufacturing cycle time, and costs associated therewith.

Other advantages of the present invention will become apparent when viewed in light of the detailed description of the preferred embodiment when taken in conjunction with the attached drawings and appended claims.

BRIEF DESCRIPTION OF THE DRAWINGS

For a more complete understanding of this invention, reference should now be made to the embodiments illustrated in greater detail in the accompanying drawings and described below by way of examples of the invention.

DETAILED DESCRIPTION OF THE INVENTION

Figure 1:
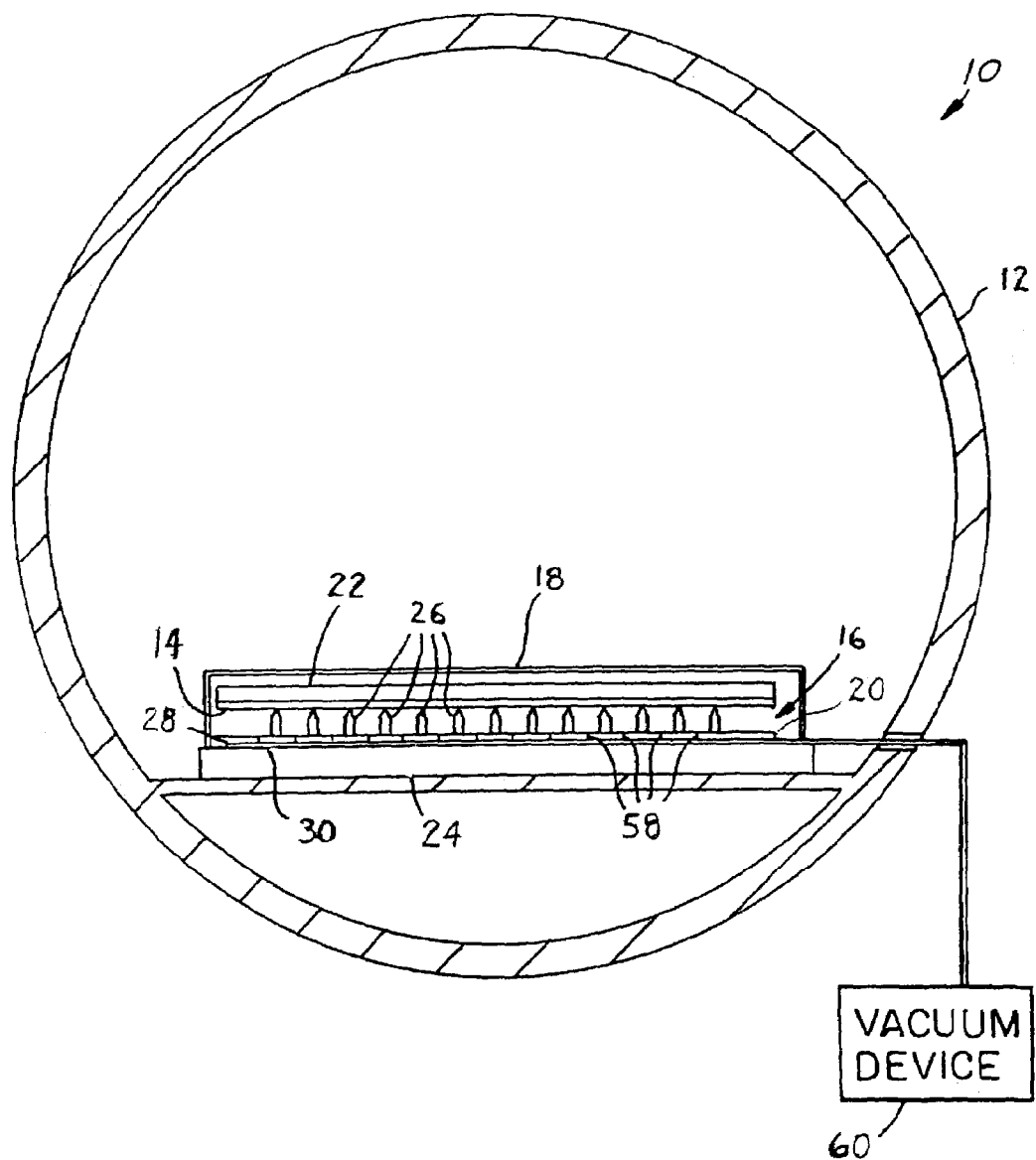
FIG. 1 is a cross-sectional view of a system for manufacturing a perforated composite laminate sheet, in accordance with one embodiment of the present invention.

In the following figures, the same reference numerals will be used to illustrate the same components in the various views.

Referring to FIG. 1, there generally is shown a cross-sectional view of a system 10 for manufacturing a perforated composite laminate sheet, according to one embodiment of the present invention. In this embodiment, the system 10 includes an autoclave machine 12 for utilizing substantially low pressures in order to perforate and consolidate an uncured laminate sheet 14 in one continuous cycle of operation. This system 10 is beneficial because it eliminates the need for two or more separate machines that independently perforate and consolidate the laminate sheet 14.

However, it is understood that the system 10 can include various other machines and apply either high pressure or low pressure for the purpose of perforating and consolidating the laminate sheet in one or more cycles of operation. For example, the system 10 can apply either high or low pressure utilizing a roller machine, a press machine, a bladder device, or a variety of other suitable pressure application mechanisms or combinations thereof.

Referring back to FIG. 1, the autoclave machine 12 is intended to apply low positive pressure, e.g. less than 150 psi, and a predetermined amount of heat to the laminate sheet 14 for the purpose of perforating and consolidating the laminate sheet 14. Specifically, the autoclave machine 12 applies pressure and the heat to an assembly 16 sealed between a vacuum bagging film 18 and a tool base 24. This assembly 16 includes one or more pinmats 20, the laminate sheet 14 laid on top of the pinmat 20, and a flowable pressure pad 22 laid on top of the laminate sheet 14.

These pinmats 20 are nested together and attached to the tool base 24. Each pinmat 20 is a one-piece injection molded body. This integral construction may be comprised of a talc-filled polypropylene material. However, it is understood that the pinmat 20 may instead be comprised of two or more separate pieces that are coupled together. For example, the pins 26 may be separate individual pieces comprised of steel or carbon-fiber, which are molded into or otherwise attached to a mat structure. This mat structure can be comprised of a flexible urethane material, an aramid fiber laminate, or a variety of other suitable materials as desired. Additionally, each pinmat 20 has a mat portion 28 and a series of faceted pins 26 extending from the mat portion 28. These pins 26 are detailed in the description for FIGS. 3A-3D and 4A-4D.

Figure 5A:
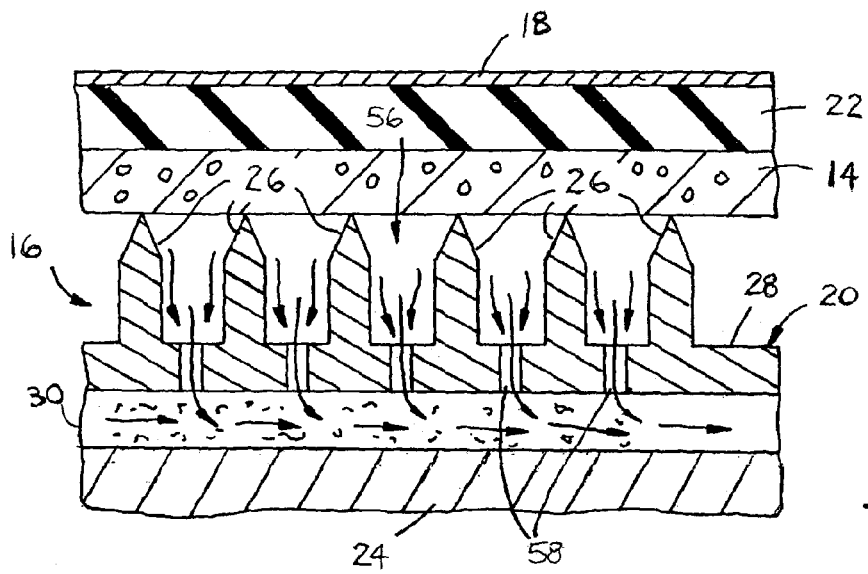
FIG. 5A is a magnified cross-sectional representation of the system shown in FIG. 1 before the perforation and consolidation of the laminate sheet.
Figure 5B:
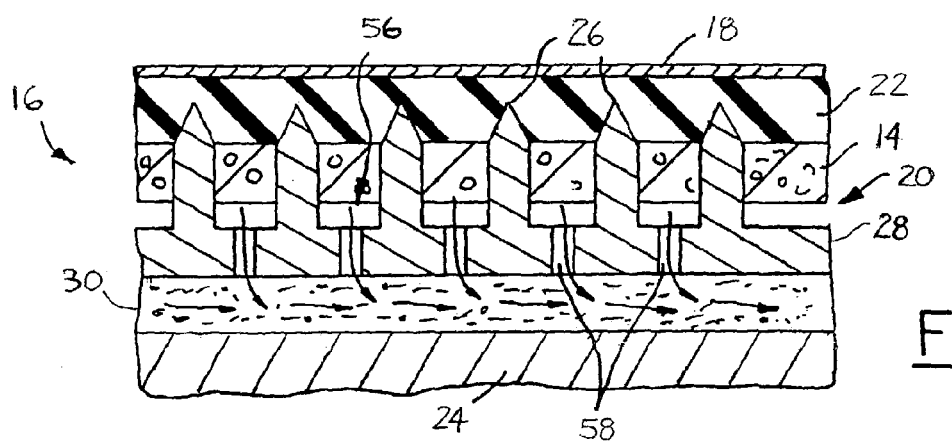
FIG. 5B is a magnified cross-sectional representation of the perforation procedure of the system shown in FIG. 1.
Figure 5C:
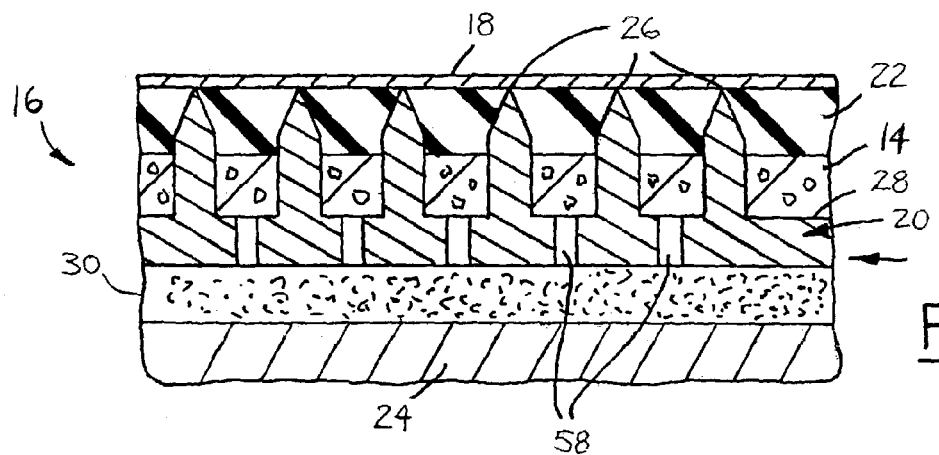
FIG. 5C is a magnified cross-sectional representation of the consolidation procedure of the system shown in FIG. 1.

Moreover, the flowable pressure pad 22 receives the pressure and the heat from the autoclave machine 12 and consequently deforms around the pins 26 in order to force the laminate sheet 14 onto the pinmat 20 (as detailed in the description for FIGS. 5A-5C). In this respect, the application of the pressure and the heat generally causes the laminate sheet 14 to be perforated by the pins 26 and consolidated against the mat portion 28 of the pinmat 20.

Furthermore, the interior of the bagging film 18 is in communication with the exterior of the autoclave machine 12 so as to allow gas from within the bagging film 18 to be extracted therefrom as the autoclave machine 12 applies pressure and heat to the assembly 16. In this regard, the assembly 16 further includes a breathable support member 30 sandwiched between the pinmat 20 and the tool base 24. The breathable support member 30 is intended to allow gas to pass from within the bagging film 18 to the atmosphere (as detailed in the description for FIGS. 5A-5C). This breathable support member 30 is comprised of a compaction-resistant gas-permeable material, e.g. a non-woven nylon or polyester mat, a mesh material, or a netting material. Alternatively, the breathable support member may be comprised of various other suitable materials and structures as desired. In yet another embodiment, the breathable support member can be entirely excluded from the system and a bottom surface of the pinmat can be constructed for permitting gas to pass between the mat portion and the tool base. For example, the bottom surface of the pinmat can have channels formed therein or be otherwise textured for allowing gas to pass thereacross.

Figure 2A:
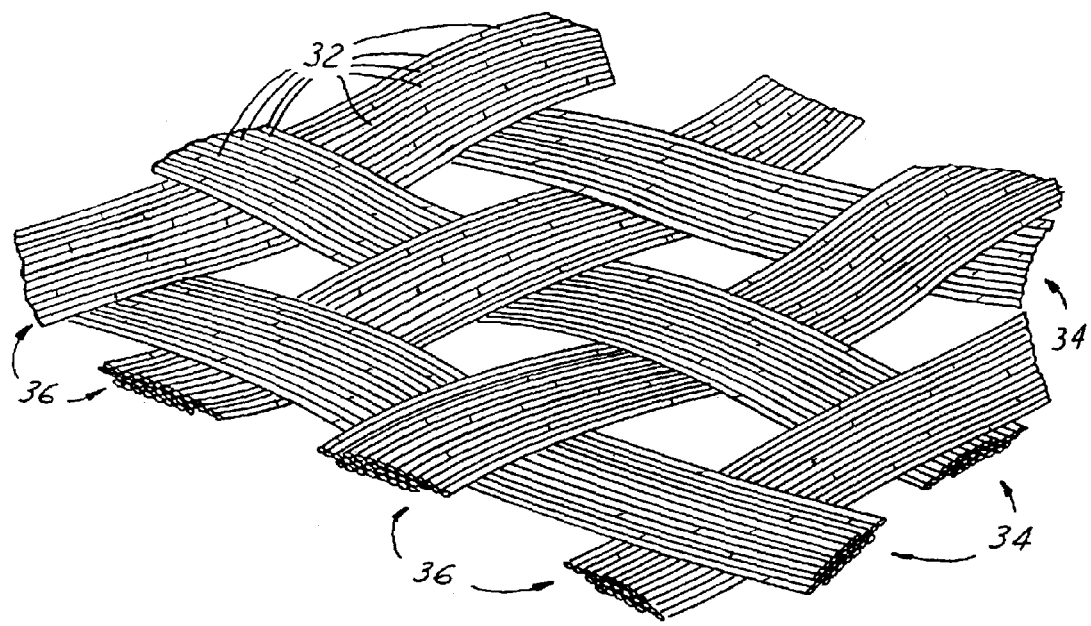
FIG. 2A is a magnified partially cutaway representation of one ply of the laminate sheet shown in FIG. 1.
Figure 2B:
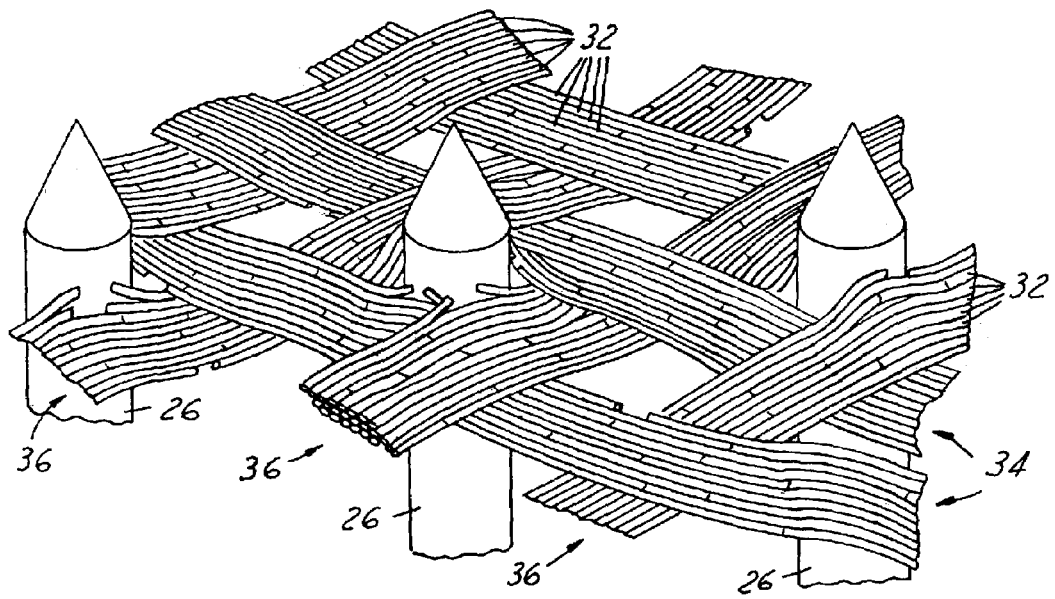
FIG. 2B is a magnified partially cutaway representation of the perforation of the laminate sheet shown in FIG. 2A.

Referring now to FIGS. 2A and 2B, there are shown magnified partially cutaway representations of one ply of a laminate sheet 14, according to one embodiment of the present invention. This sheet includes a series of discontinuous fibers 32 arranged in a predetermined orientation. This construction provides for a substantial amount of strength in the laminate sheet 14 while simultaneously permitting the pins 26 to penetrate the laminate sheet 14 at relatively low pressures, e.g. about 150 psi or lower. However, it is understood that the pressure requirements can vary depending upon a variety of factors, including the thickness of the laminate sheet 14, the length of the discontinuous fibers 32, the type of material comprising the laminate sheet 14, the geometry of the pins 26, the material comprising the flowable pressure pad 22, and the amount of heat applied to the laminate sheet 14.

Specifically, the discontinuous nature of each fiber 32 corresponds to a sufficiently short length of the fiber 32, e.g. less than about two inches, which is held in position by the interlocking nature of the fabric weave and to a lesser degree by the resin of the laminate sheet 14. In comparison to a lengthy continuous fiber, the relatively short length of the discontinuous fibers 32 causes less of the fabric weave to interlock with each discontinuous fiber 32 thereby decreasing the grip of the fabric weave on the fiber 32. Also, the relatively short length of the discontinuous fiber 32 causes less resin to be cast around each fiber so as to cause the resin to have a decreased grip on that fiber 32.

The interface portion of each fiber 32 is engaged by a pin 26 and displaced laterally outward from the longitudinal axis thereby drawing peripheral portions of that fiber 32 toward the interface portion along the longitudinal axis of that fiber 32. In view of these circumstances, the relatively short length of the discontinuous fibers 32 represents that the interlocking fabric weave and the resin have a decreased amount of grip on those short fibers. As a result, this decreased grip permits the autoclave machine 12 to apply a substantially low amount of pressure through the pins 26 for the purpose of displacing those fibers 32 within the sheet 14.

Each discontinuous fiber 32 is comprised of a substantially inelastic strand material. Examples of this inelastic material can include carbon fiber, glass fiber, aramid fiber, or a variety of other suitable materials. These discontinuous fibers 32 are bundled into a series of warp tows 34 and a series of weft tows 36. Preferably, three thousand (3,000) fibers are bundled into each cross-section of each tow, but it is understood that more or less fibers can be utilized as desired. The weft tows 36 are generally woven perpendicularly through the warp tows 34 so as to form one ply or layer. Likewise, consecutive layers (not shown) are formed and offset from adjacent layers at a predetermined angle, e.g. 45 or 90 degrees, so as to provide the laminate sheet 14 with a predetermined thickness and strength. Although a plain weave is illustrated in FIGS. 2A and 2B, it is understood that various other suitable woven forms can be utilized. Moreover, instead of utilizing a woven form, it is understood that the tows can be arranged in a unidirectional form with the tows in a single layer running parallel to each other.

The discontinuous fibers 32 preferably are arranged in a predetermined orientation within each tow 34, 36 so as to provide the sheet 14 with a substantial amount of strength in view of the discontinuous nature of the fibers 32. As shown in FIGS. 2A and 2B, the fibers 32 can be staggered within each tow 34, 36 in order to provide maximum overlap of adjacent fibers. In this respect, the free ends of fibers in one column are remotely located from the free ends of fibers located in an adjacent column. However, it is understood that the discontinuous fibers 32 can instead be arranged in various other suitable orientations within the tows 34, 36 as desired. Moreover, the fibers 32 can also be arranged randomly within each tow 34, 36.

In one embodiment, the laminate sheet 14 is constructed by initially forming multiple, stacked layers of woven fabric having warp tows 34 and weft tows 36, that are each comprised of continuous fibers. This fabric is then impregnated with resin (not shown). Thereafter, a cutting tool is utilized for incising all the continuous fibers across the length and the width of the laminate sheet 14 so as to create discontinuous fibers 32 within the sheet 14.

For example, the cutting tool can partially incise two or more adjacent tows depending upon the incision width and location. By way of another example, each incision can overlap the previous incision by a sufficiently short predetermined length so as to assure that all the continuous fibers are incised. It is understood that the incisions can vary in length and the manner in which they are applied. Additionally, it is also understood that the discontinuous fibers and the remaining structure of the laminate sheet 14 can instead be formed by a variety of other suitable methods.

Figure 3A:
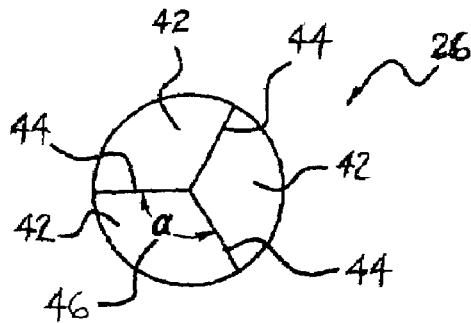
FIG. 3A is a top axial view of a pin utilized for perforating an uncured laminate sheet, in accordance with one embodiment of the present invention.
Figure 3C:
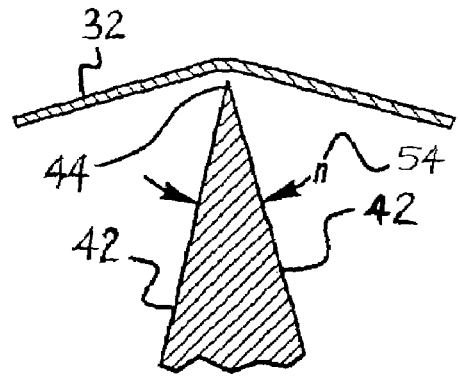
FIG. 3C is a cross-sectional view of the pin shown in FIG. 3B, as taken along line 3C-3C, illustrating a concentration of stress within a fiber.
Figure 3B:
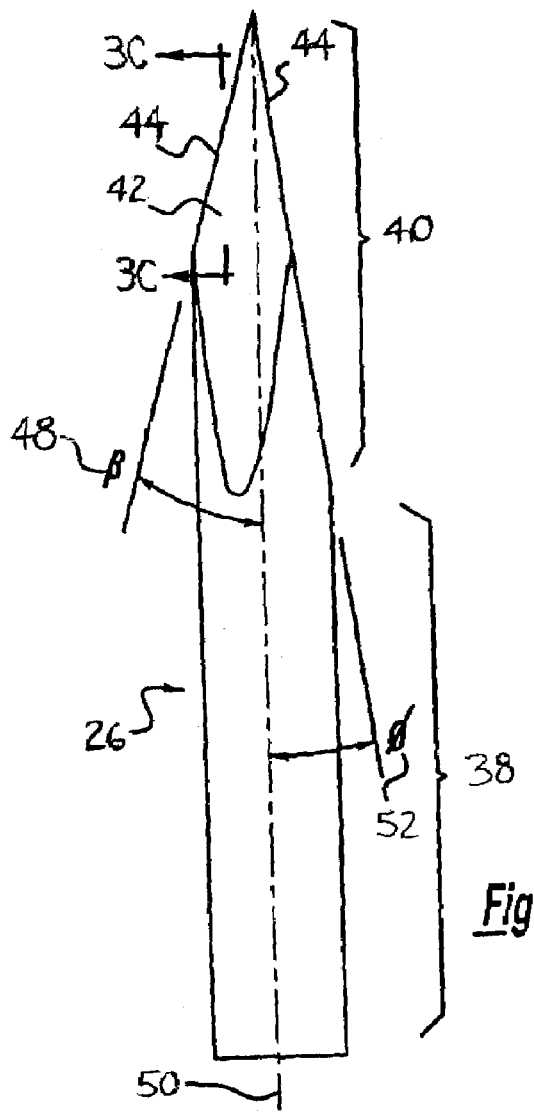
FIG. 3B is a longitudinal view of the pin shown in FIG. 3A.

Referring now to FIGS. 3A and 3B, there are shown a top axial view and a longitudinal view of the pin 26, according to one embodiment of the present invention. Each pin 26 includes a shank portion 38 and a tip portion 40 extending from the shank portion 38. The diameter of these shank portions 38 can either be constant or taper in size from the mat portion 28 of the pinmat 20 to the tip portion 40 of the pin 26. The tapering diameter can be beneficial because it can allow the laminate sheet 14 to be more easily removed from the pinmat 20 after the sheet 14 has been perforated and consolidated.

Furthermore, the tip portion 40 includes one or more facets 42 that are positioned adjacent to one or more edges 44. These edges 44 are intended to fracture fibers 32 at substantially low pressures. In this regard, the pins 26 can apply substantially low pressures to the resultant shorter lengths of fibers for displacing those fibers beyond the pin paths.

In one embodiment, as shown in FIGS. 3A and 3B, the tip portion 40 is constructed with a radially symmetrical structure including three planar facets 42 adjoined by three linear edges 44. However, it is understood that more or less than three facets 42 and edges 44 can be utilized as desired. For example, as exemplified in FIGS. 4A-4D, the tip portion 40 can have a radially symmetrical structure with four facets 42 that are adjoined by four edges 44. Additionally, it is understood that these facets 42 and edges 44 can be non-planar or non-linear and that the tip portion 40 may be asymmetrical as desired.

Figure 3D:
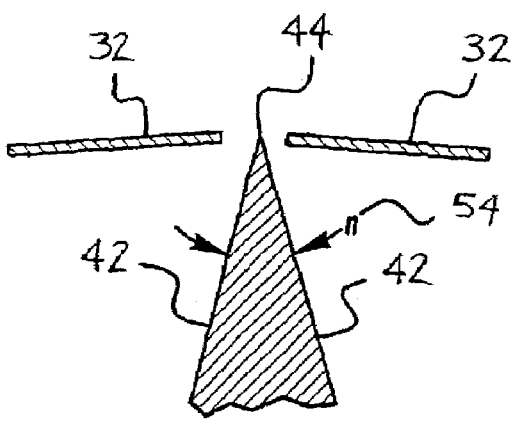
FIG. 3D is a cross-sectional view of the pin shown in FIG. 3B, as taken along line 3C-3C, illustrating the fracture of the fiber.

In general, the structure of the tip portion 40 is intended to cause the fiber 32 (as shown in FIGS. 3C and 3D) to fracture even while sufficiently low pressure is applied through the pin 26 and the fiber 32 experiences lower tensile loads. Specifically, the structure of the tip portion 40 concentrates stress within each fiber 32 by forcing each inelastic fiber 32 to bend close to or beyond the fiber's minimum bend radius. As a result, the fibers 32 fracture when substantially low pressures are applied through the pins 26 to the sheet 14.

In addition, each edge 44 is sufficiently sharp for cutting each fiber 32 that contacts the edge 44. The benefit of cutting or otherwise fracturing the fibers 32 is that each shorter length of fiber is held in place by less of the interlocking fabric weave and by less resin than the original longer length of fiber. This decreased amount of resin represents that the resin secures the fiber in its position with less force. Consequently, these shorter lengths of fiber can be displaced by the pins 26 with less pressure applied through those pins. Therefore, in sum, the structure of the tip portion 40 concentrates stress within particular points of the fiber and also cuts the fibers at those points so as to allow the pin to penetrate the sheet 14 at substantially low pressures. This structure is detailed in the following descriptions for FIGS. 3A-3D and 4A-4D.

In another embodiment, the system can include a conventional pinmat with conical pin tips instead of the faceted pinmat described herein. This system still requires substantially low pressures for perforating the laminate sheet because the discontinuous fibers of the laminate sheet are sufficiently short for allowing the pins to displace those fibers at low pressures. In this regard, the fracture of the discontinuous fibers is not required because those fibers are already sufficiently short in length.

In yet another embodiment, the system can include a conventional laminate sheet comprised of continuous laminate fibers rather than a laminate sheet comprised of discontinuous fibers. This system may still only require low pressures for perforating the laminate sheet because the faceted pinmat can fracture the continuous fibers and create the shorter lengths of fiber, which can be displaced at lower applied pressures.

Figure 4A:
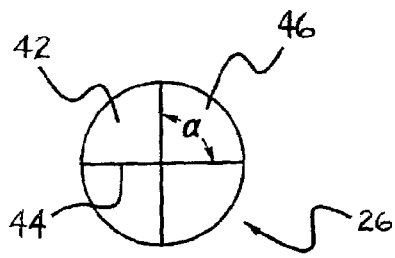
FIG. 4A is a top axial view of a pin utilized for perforating an uncured laminate sheet, in accordance with another embodiment of the present invention.
Figure 4C:
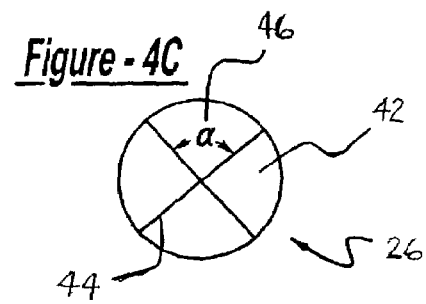
FIG. 4C is another top axial view of the pin shown in FIG. 4A.

Referring now specifically to FIGS. 3A, 4A, and 4C, the edges 44 are positioned at a predetermined clocking angle 46, relative to each other. For example, the clocking angle 46 for the symmetrical three-faceted tip portion 40 shown in FIG. 3 includes a clocking angle 46 of 120 degrees. However, it is also understood that each edge 44 may be positioned at a variety of other suitable clocking angles 46 as desired. For example, an asymmetrical, multi-faceted tip portion can include various different clocking angles 46. The clocking angle 46 can also be used to orient the edges relative to the mat portion.

Referring back to FIGS. 3B and 4B, these edges 44 are also positioned at a predetermined edge angle 48 from a longitudinal axis 50 of the pin 26. This edge angle 48 allows the edge 44 to facilitate the penetration of the laminate sheet 14. An example of a suitable edge angle 48 is 30 degrees. Decreasing the edge angle 48 to even lower values such as 15 degrees can likewise decrease the pressure requirements for causing the pins 26 to penetrate the sheet 14.

In another embodiment, the tip portion 40 may have edges that are each positioned at different edge angles from the longitudinal axis 50. Also, as mentioned above, the edges may be non-linear or curved thereby dispensing with edge angle measurements.

Figure 4B:
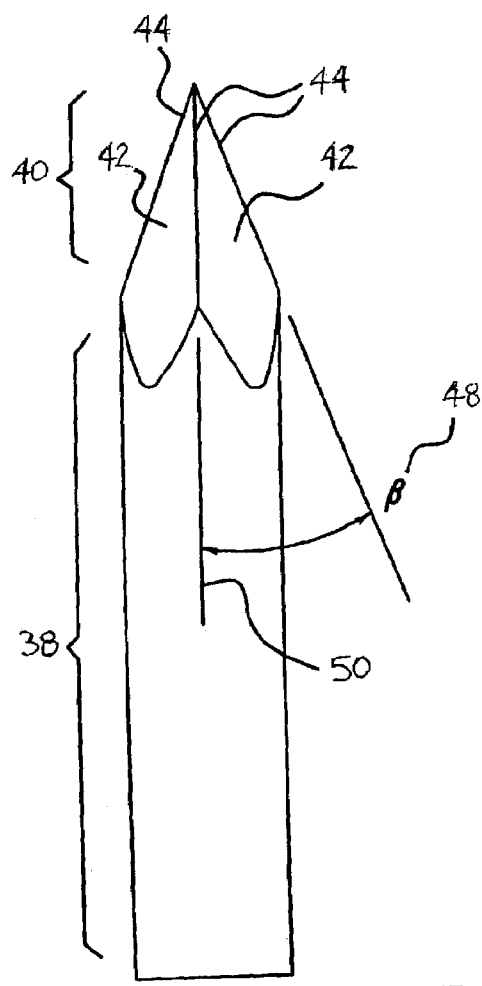
FIG. 4B is a longitudinal view of the pin shown in FIG. 4A.
Figure 4D:
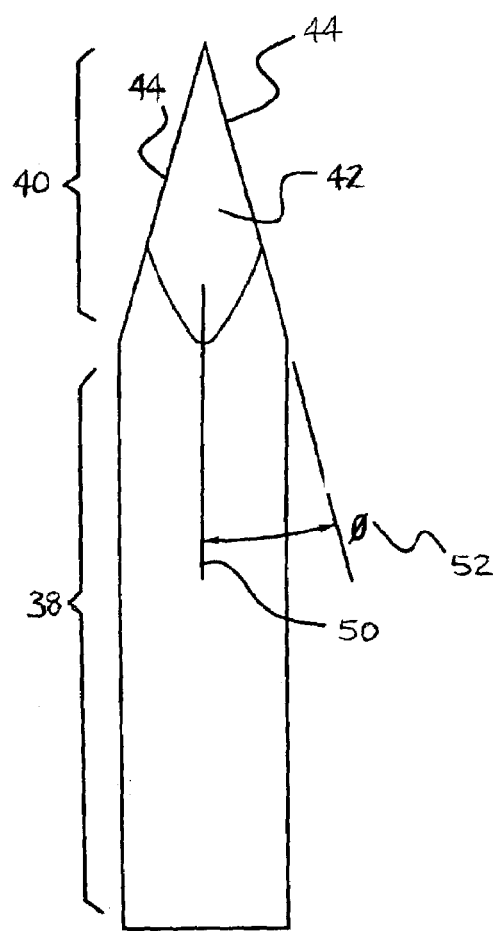
FIG. 4D is a longitudinal view of the pin shown in FIG. 4C.

Furthermore, as shown in FIG. 4B and 4D, each facet 42 is positioned at a predetermined facet angle 52 relative to the longitudinal axis 50 of the shank portion 38. Similar to the edge angle 48, decreasing the facet angle 52 for a given number of facets 42 can facilitate in decreasing the amount of pressure required to penetrate the laminate sheet 14. Every facet 42 on the tip portion 40 can be positioned at the same facet angle 52. However, it is also understood that the facet angle 52 may vary from facet to facet. Moreover, as mentioned above, the facets may be non-planar thereby dispensing with facet angle measurements.

Additionally, as shown in FIGS. 3C and 3D, adjacent facets 42 are positioned relative to each other at a predetermined blade angle 54. This blade angle 54 defines the structure surrounding the cutting edge 44, which is intended to contact the fibers 32 as the pin 26 penetrates the laminate sheet 14. In this regard, a sufficiently small blade angle 54 can provide for sufficient clearance for the fiber 32 for the purpose of allowing that fiber 32 to bend around the cutting edge 44 beyond the fiber's minimum bending radii. In other words, a sufficiently small blade angle 54 can concentrate stress within a discrete portion of each fiber so as to cause the relatively inelastic fiber 32 to fracture. For this reason, decreasing the blade angle 54 can facilitate in decreasing the amount of pressure required to penetrate the laminate sheet 14.

Referring now to FIGS. 5A-5C, there are shown magnified cross-sectional representations of the operation of the system 10 shown in FIG. 1. As shown in FIG. 5A, the flowable pressure pad 22 and the laminate sheet 14 initially are positioned on top of the pins 26 of the pinmat 20. The autoclave machine 12 applies a predetermined amount of pressure to the laminate sheet 14 via the pressure pad 22 for the purpose of forcing the laminate sheet 14 onto the pinmat 20. However, it is also understood that the pinmat 20 may be forced upon the laminate sheet 14 instead of forcing the sheet 14 onto the pinmat 20.

As shown in FIG. 5B, the applied pressure and heat force the pressure pad 22 and the laminate sheet 14 downward so as to displace or fracture the fibers 32 in the pin paths thereby allowing the pins 26 to penetrate the laminate sheet 14 and form perforations therein. The flowable pressure pad 22 is comprised of a flowable and penetrable material that substantially flows or deforms around the pins 26 as the pressure pad 22 forces the laminate sheet 14 onto the pinmat 20. The deformation of the pressure pad 22 is intended to decrease or even eliminate the amount of pressure that is applied to the pins 26 and increase the amount of pressure that is applied to the laminate sheet 14. This feature is beneficial because the applied pressure is concentrated on perforating and consolidating the laminate sheet 14 rather than being wasted on the pins 26.

In addition, the deformability of the pressure pad 22 is advantageous because it can decrease and even eliminate a pressure differential between the perforated and non-perforated regions of the sheet 14. Moreover, the decrease in pressure differential can likewise decrease the amount of resin migration from the non-perforated regions to the perforated regions. Eliminating or decreasing resin migration is beneficial because it decreases the formation of depressions in the laminate sheet 14 which can otherwise decrease the strength of the laminate sheet 14 and impede subsequent core bonding operations.

Preferably, the pressure pad 22 is comprised of a material that has or attains a fluid state when the pressure pad 22 is exposed to one or more conditions typically produced by an autoclave machine 12 during the perforation or the consolidation of the laminate sheet 14. For example, these conditions can include a particular temperature or a particular pressure. However, it is understood that the pressure pad 22 can instead be comprised of a material that is or becomes substantially deformable when the pressure pad 22 is subjected to the conditions described above.

Examples of the flowable materials that comprise the pressure pad include a thermoplastic material, a fluid-like material, a room-temperature deformable material, a room-temperature penetrable material, and a variety of super elongation materials.

Specifically, the thermoplastic materials comprising the flowable pressure pad 22 can include a polyethylene material, an ethylene vinyl acetate material, a thermoplastic elastomer such as a styrene-butadiene-styrene material, a thermoplastic polyolefin material, a polyolefin elastomer material, a thermoplastic polyurethane material, or a variety of other suitable thermoplastic materials.

Fluid-like materials can include uncured or partially cured thermoset adhesive films, a gel material, a glycol material, and uncured or partially cured thermoset elastomer sheets.

Moreover, the room-temperature deformable materials can be a solid-like material including a caulk material, a clay material, a wax material, or various other room-temperature deformable materials as desired.

Also, the room-temperature penetrable material can include a polyethylene foam material, a polypropylene foam material, a cross-linked polyvinyl, or a variety of other suitable thermoset foam materials.

Super-elongation materials can include a nylon bagging film with substantial elongation characteristics and a thermoset rubber with substantial elongation characteristics.

Referring back to FIGS. 5A-5C, as the laminate sheet 14 and pressure pad 22 are forced closer to the pinmat 20, gas is withdrawn from the region 56 between the laminate sheet 14 and the pinmat 20. The removal of this gas is beneficial because it prevents the gas from becoming trapped in pockets beneath the laminate sheet 14 and then being pressurized, which can result in major defects in the sheet 14, e.g. substantial porosity and other poor consolidation characteristics. This gas flows from the region 56 between the laminate sheet 14 and the pinmat 20 through one or more ventilation holes 58 formed in the mat portion 28 of the pinmat 20.

In one embodiment, a vacuum device 60 or any suitable negative pressure source is coupled to the ventilation holes 58 for the purpose of suctioning the gas from this region 56. In another embodiment, the positive pressure applied to the assembly 16 by the autoclave machine 12 can be utilized to force the gas out of the region 56, through the ventilation holes 58, and ultimately to the exterior of the autoclave machine 12.

As introduced above, the breathable support member 30 is sandwiched between the pinmat 20 and the tool base 24. This breathable support member 30 has the vacuum device 60 coupled thereto for removing the gas between the laminate sheet 14 and the pinmat 20. However, the negative pressure source may instead be directly coupled to the ventilation holes 58 themselves as desired.

Figure 6:
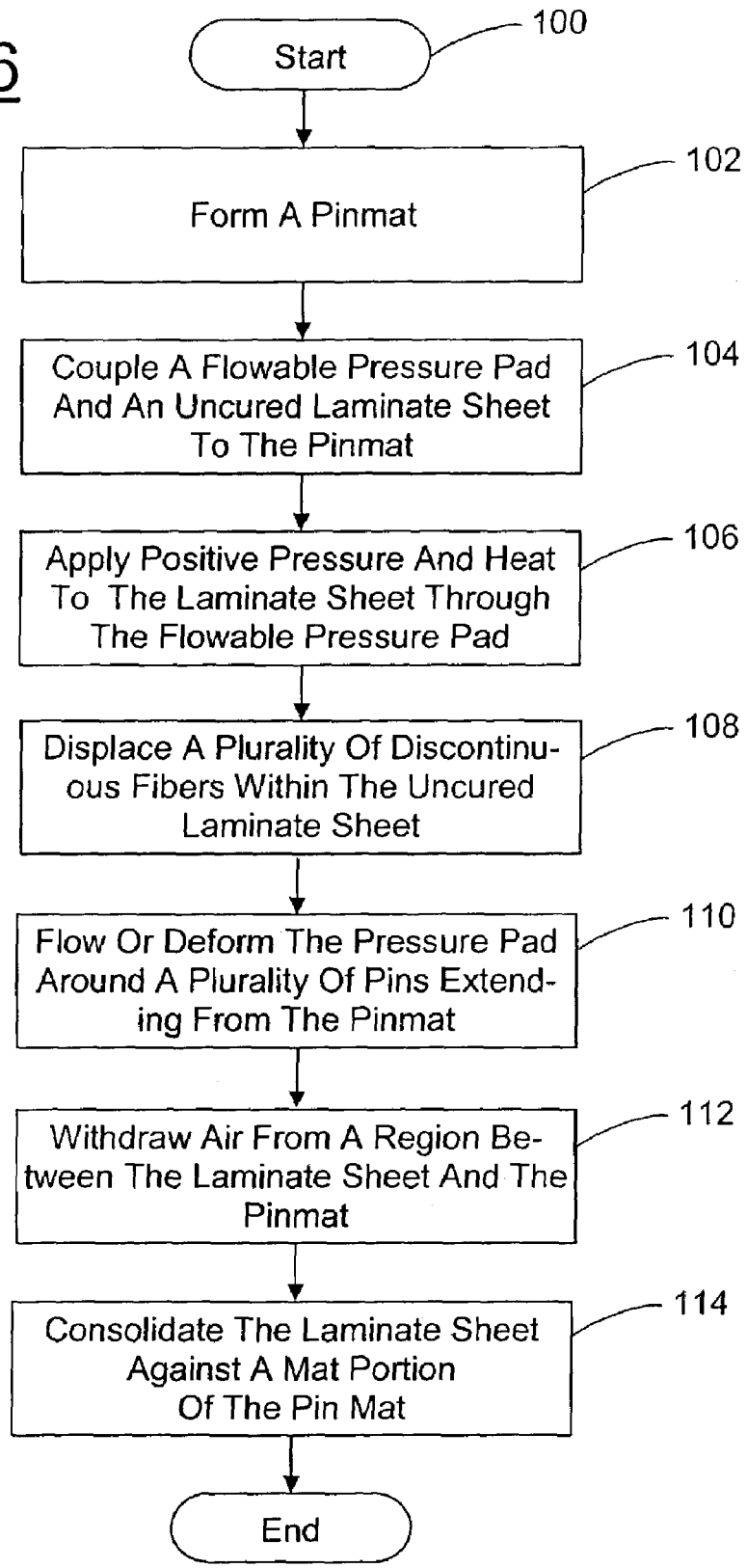
FIG. 6 is a logic flow diagram for manufacturing a perforated laminate sheet, in accordance with one embodiment of the present invention.

Referring now to FIG. 6, there is shown a logic flow diagram illustrating a method for simultaneously perforating and consolidating the laminate sheet 14 in one cycle according to one embodiment of the present invention. The method commences in step 100 and then immediately proceeds to step 102.

In step 102, a pinmat 20 is formed by an injection molding process utilizing a talc-filled polypropylene material. The resultant pinmat 20 includes a mat portion 28 and a plurality of pins 26 extending from the mat portion 28. In one embodiment, each pin 26 has a shank portion 38 and a tip portion 40 extending from the shank portion 38. Additionally, each tip portion 40 includes one or more facets 42 positioned adjacent to one or more edges 44. As described above, the edges 44 are intended to fracture the fibers of the laminate sheet 14.

Alternatively, step 102 may be accomplished by integrating a plurality of separate individual pins into a mat structure. For example, a series of steel or carbon-fiber pins may be mold-in mounted to a separate mat structure. This mat structure can be made of a flexible urethane material, an aramid fiber laminate, or various other suitable materials. The benefit of this pinmat is that it is sufficiently durable and that it can be reused. After the pinmat 20 is formed, the sequence then proceeds to step 104.

According to yet another embodiment, step 102 is accomplished by forming a conventional pinmat having conical tips, instead of a faceted pinmat. As described above, a conventional pinmat can be utilized with low pressure for perforating a laminate sheet having discontinuous fibers.

In step 104, a laminate sheet 14 and a pressure pad 22 are placed on top of the pins 26 of the pinmat 20. Thereafter, the assembly 16 of the laminate sheet 14, the pressure pad 22, and the pinmat 20 is sealed with a vacuum bagging film 18 against a tool base 24. Vacuum sealant tape, an extruded tacky material, caulking material, or various other suitable materials can be utilized for sealing the film 18 against the tool base 24. This film 18 and the assembly 16 contained therein are placed within an autoclave machine 12 and coupled to a vacuum device 60. Then, the sequence proceeds to step 106.

In step 106, the autoclave machine 12 is utilized to apply a predetermined amount of pressure and a predetermined amount of heat to the pressure pad 22 for a predetermined amount of time. However, as described above, it is understood that various other machines can be utilized to apply heat or pressure to the laminate sheet 14. After pressure and heat are applied to the pressure pad 22, the sequence proceeds to step 108.

In step 108, the pins 26 penetrate the laminate sheet 14 and displace the discontinuous fibers 32 beyond the paths of the pins 26. The abbreviated length of the fibers 32 decreases the portion of the interlocking fabric weave and the amount of resin that collectively holds each fiber 32 in place thereby decreasing the amount of tension created in the fibers 32 as the pins displace those fibers 32.

In an alternative embodiment, step 108 is accomplished by initially fracturing the fibers of the laminate sheet 14 within the pin paths and then displacing those shorter length fibers. This step is accomplished by engaging the fibers to one or more sharp cutting edges 44 formed on the tip portions 40 of each pin 26. However, it is understood that this step may be accomplished by various other suitable methods as desired. Then, the sequence proceeds to step 110.

In step 110, the pressure pad 22 flows around or is deformed around the pins 26 as the applied pressure and heat continue to force the pad 22 onto the pinmat 20. In this regard, step 110 begins after step 108 has already begun but before step 108 is completely finished. This pressure pad 22 is comprised of the flowable and penetrable material, as described above, which permits the pressure pad 22 to deform around the pins 26 and transfer a more substantial portion of the pressure to the perforated regions of the laminate sheet 14. In this regard, the applied pressure is focused on perforating and later consolidating the sheet 14 against the mat portion 28 of the pinmat 20 rather than being transferred to the pins 26. This application of pressure is beneficial because it results in improved consolidation of the laminate sheet 14. Then, the sequence proceeds to step 112.

In step 112, gas is withdrawn from the region 56 between the laminate sheet 14 and the pinmat 20. The removal of this gas prevents the gas from becoming trapped in pockets beneath the laminate sheet 14 and then being pressurized, which can result in major defects in the sheet 14, e.g. substantial porosity and other poor consolidation characteristics. This step may be accomplished by expelling the gas through one or more ventilation holes 58 formed within the pinmat 20, through the breathable support member 30, and then ultimately into the vacuum device 60, the atmosphere, or any suitable external container. Then, the sequence proceeds to step 114.

In step 114, the pressure pad 22 continues to flow or deform around the pins 26 so as to transfer a substantial amount of the applied pressure to the laminate sheet 14 for the purpose of improving consolidation of the sheet 14 against the mat portion 28. In this step, the autoclave machine 12 forces the pressure pad 22 and the laminate sheet 14 against the mat portion 28 of the pinmat 20 so as to fully consolidate the perforated and non-perforated regions of the laminate sheet 14.

While particular embodiments of the invention have been shown and described, numerous variations and alternate embodiments will occur to those skilled in the art. Accordingly, it is intended that the invention be limited only in terms of the appended claims.

What is claimed is:

1. A method for manufacturing a perforated and consolidated laminate sheet for an engine nacelle, comprising:
   applying a positive pressure to a pressure pad comprised of a flowable and penetrable material and
   compressing an uncured laminate sheet between said pressure pad and a plurality of projections, wherein said flowable and penetrable material of said pressure pad substantially flows or deforms around said plurality of projections, thereby concentrating said positive pressure as applied to perforating and consolidating said laminate sheet, while minimizing or eliminating said positive pressure as applied to said plurality of projections, and further minimizing or eliminating the pressure differential between the perforated and non-perforated regions of the perforated and consolidated laminate sheet.

2. The method of claim 1, wherein said plurality of projections is formed as part of a pinmat, said pinmat having a mat portion and said plurality of projections extending from said mat portion, said plurality of projections comprising a plurality of shank portions extending from said mat portion and a plurality of tip portions extending from said plurality of shank portions, said plurality of tip portions having at least one facet positioned adjacent to at least one edge, said at least edge intended to fracture a plurality of fibers in an uncured laminated sheet.

3. The method of claim 1, wherein the flowable and penetrable material is a thermoplastic material comprised of at least one of:
   a polyethylene material;
   a styrene-butadiene-styrene material;
   a thermoplastic polyolefin material;
   a polyolefin elastomer material; and
   a thermoplastic polyurethane material.

4. The method of claim 1, wherein the flowable and penetrable material is comprised at least of an ethylene vinyl acetate material.

5. The method of claim 1, wherein the flowable and penetrable material is a malleable material comprised of at least one of:
   a thermoset adhesive film;
   a gel material;
   a glycol material; and
   a thermoset elastomer sheet.

6. The method of claim 1, wherein the flowable and penetrable material is a room-temperature deformable material comprised of at least one of:
   a caulk material;
   a clay material; and
   a wax material.

7. The method of claim 1, wherein the flowable and penetrable material is a room-temperature penetrable material comprised of a thermoset foam material, wherein the thermoset foam material is comprised of at least one of:
   a polyethylene foam material;
   a polypropylene foam material;
   a cross-linked polyvinyl; and
   a soft plastic film.

8. The method of claim 1, wherein the flowable and penetrable material is an elongation material comprised at least one of:
   a nylon bagging film; and
   a thermoset rubber material.

9. The method of claim 1, wherein said pressure is less than 150 psi.

* * * * *